(12) United States Patent
Hemachandran et al.

(10) Patent No.: US 8,805,989 B2
(45) Date of Patent: Aug. 12, 2014

(54) BUSINESS CONTINUITY ON CLOUD ENTERPRISE DATA CENTERS

(75) Inventors: Satish K. Hemachandran, Newnan, GA (US); Christopher T. Sears, Avondale Estates, GA (US)

(73) Assignee: Sungard Availability Services, LP, Wayne, PA (US)

( * ) Notice: Subject to any disclaimer, the term of this patent is extended or adjusted under 35 U.S.C. 154(b) by 0 days.

(21) Appl. No.: 13/531,744

(22) Filed: Jun. 25, 2012

(65) Prior Publication Data

US 2013/0346573 A1 Dec. 26, 2013

(51) Int. Cl.
*G06F 15/173* (2006.01)

(52) U.S. Cl.
USPC .......................................................... 709/223

(58) Field of Classification Search
None
See application file for complete search history.

(56) References Cited

U.S. PATENT DOCUMENTS

| | | | |
|---|---|---|---|
| 7,349,961 B2 | 3/2008 | Yamamoto | |
| 7,363,382 B1 * | 4/2008 | Bakke et al. | 709/230 |
| 7,609,619 B2 | 10/2009 | Naseh et al. | |
| 7,992,031 B2 | 8/2011 | Chavda et al. | |
| 8,037,187 B2 * | 10/2011 | Dawson et al. | 709/226 |
| 8,069,242 B2 * | 11/2011 | Hadar et al. | 709/224 |
| 8,103,906 B1 * | 1/2012 | Alibakhsh et al. | 714/13 |
| 8,209,415 B2 * | 6/2012 | Wei | 709/224 |
| 8,291,036 B2 * | 10/2012 | Poluri et al. | 709/217 |
| 8,606,938 B1 * | 12/2013 | Chong et al. | 709/228 |
| 8,607,242 B2 * | 12/2013 | Clarke | 718/104 |
| 2006/0098790 A1 | 5/2006 | Mendonca et al. | |
| 2009/0249284 A1 * | 10/2009 | Antosz et al. | 717/104 |
| 2009/0276771 A1 | 11/2009 | Nickolov et al. | |
| 2010/0100879 A1 | 4/2010 | Katiyar | |
| 2010/0131324 A1 * | 5/2010 | Ferris | 705/8 |
| 2010/0251329 A1 * | 9/2010 | Wei | 726/1 |
| 2011/0022642 A1 | 1/2011 | deMilo et al. | |
| 2011/0145413 A1 * | 6/2011 | Dawson et al. | 709/226 |
| 2011/0191296 A1 | 8/2011 | Wall et al. | |
| 2011/0258481 A1 | 10/2011 | Kern | |
| 2011/0289119 A1 * | 11/2011 | Hu et al. | 707/803 |
| 2012/0047107 A1 * | 2/2012 | Doddavula et al. | 707/620 |
| 2012/0110186 A1 * | 5/2012 | Kapur et al. | 709/226 |
| 2012/0137002 A1 * | 5/2012 | Ferris et al. | 709/226 |
| 2012/0215901 A1 * | 8/2012 | Jog et al. | 709/223 |
| 2012/0303740 A1 * | 11/2012 | Ferris | 709/217 |
| 2013/0132768 A1 * | 5/2013 | Kulkarni | 714/6.22 |

OTHER PUBLICATIONS

"HP Cloud Service Automation," Hewlett-Packard Development Company, LP; 4 pages, created Apr. 2011.

\* cited by examiner

*Primary Examiner* — Ninos Donabed
(74) *Attorney, Agent, or Firm* — Cesari and McKenna, LLP

(57) ABSTRACT

Business continuity services in a data processing environment where a service provider offers virtual data center services to numerous customers.

19 Claims, 16 Drawing Sheets

| | | ELEMENT MANAGERS | CLOUD PORTAL |
|---|---|---|---|
| 1. | RE-IP MANAGEMENT & BACKUP INTERFACES | ✓ | |
| 2. | UPDATE CUSTOMER FIREWALL RULES BASED ON POLICY | ✓ | ✓ |
| 3. | CREATE CUSTOMER VPN | ✓ | |
| 4. | CREATE LB WITH CUSTOMER RULES BASED ON POLICY | ✓ | ✓ |
| 5. | CREATE CUSTOMER VLANs | ✓ | ✓ |
| 6. | CREATE RECOVERY PLAN FOR CUSTOMER VDC (vCON) | ✓ | |
| 7. | RECOVER VMs BASED ON RECOVERY PLAN (vCON) | ✓ | |
| 8. | REBALANCE RECOVERED VMs ON ESX (vMOTION DIRECTLY OR BASED ON DRS RECOMMENDATION) | ✓ | |
| 9. | CUSTOMER CONNECTS TO TEST VMs<br>- STANDARD CONNECTIVITY (IPSEC/SITE-TO-SITE)<br>- CUSTOMER WILL INITIATE DNS UPDATES | ✓ | |
| 10. | RECONFIGURE MANAGEMENT SERVICES FOR RECOVERED VMs (NIMSOFT, NETBACKUP, OPSWARE, AV) | ✓ | |

FIG. 15

|   |   | ELEMENT MANAGERS | CLOUD PORTAL |
|---|---|---|---|
| 1. | UPDATE FIREWALL RULES | ✓ | ✓ |
| 2. | CREATE CUSTOMER VPN CONNECTION | ✓ | |
| 3. | CREATE LOADBALANCER WITH CUSTOMER RULES | ✓ | ✓ |
| 4. | CREATING CUSTOMER VLANs | ✓ | ✓ |
| 5. | CREATE RECOVERY PLAN FOR CUSTOMER VDC (vCON) | ✓ | |
| 6. | RECOVER VMs BASED ON RECOVERY PLAN (vCON) | ✓ | |
| 7. | REBALANCE RECOVERED VMs ON ESX (vMOTION DIRECTLY OR BASED ON DRS RECOMMENDATION) | ✓ | |
| 8. | CUSTOMER CONNECTS TO TEST VMs<br>- STANDARD CONNECTIVITY (IPSEC/SITE-TO-SITE<br>- CUSTOMER WILL INITIATE DNS UPDATES | | |
| 9. | REPLICATION BETWEEN TARGET AND SOURCE RE-ENABLED | ✓ | |
| 10. | DELETE LB, VLANs, F/W, RECOVERED VMs<br>NOTE: THIS SHOULD ONLY BE DONE AFTER RESYNC HAS BEEN COMPLETED | ✓ | |

FIG. 16

BUSINESS CONTINUITY ON CLOUD ENTERPRISE DATA CENTERS

BACKGROUND

The users of data processing equipment increasingly find the cloud-based infrastructure-as-a-service, or IaaS, model to be a flexible, easy, and affordable way to access the IT infrastructure they need. By moving servers and applications into logical units referred to as Virtual Data Centers (VDCs), that can be easily deployed with an IaaS provider, these customers are free to build out equipment that exactly fits their requirements at the outset, while having the option to adjust with changing future needs on a "pay as you go" basis. VDCs, like other cloud-based services, bring this promise of scalability to allow expanding servers and applications as business needs grow, without having to spend for unneeded hardware resources in advance. Additional benefits provided by professional level cloud service providers include access to equipment with superior performance, security, disaster recovery, and easy access to information technology consulting services.

Beyond simply moving hardware resources to a remote location accessible in the cloud via a network connection, multiple virtualization technologies provide further abstraction layers within VDCs that makes them attractive. Server virtualization decouples physical hardware from the operating system and other information technology and resources. Server virtualization allows multiple virtual machines with different operating systems and applications to run in isolation side by side on the same physical machine. A virtual machine is a software representation of a physical machine, specifying its own set of virtual hardware resources such as processors, memory, storage, network interfaces, and so forth upon which an operating system and applications are run.

SUMMARY

Increasingly, cloud service providers are offering additional value-added services to IaaS customers as a way of retaining existing customers and attracting new ones. Services being offered to customers include, for example, business continuity services. These services are optional but subscribing to them may be beneficial to the use and operation of each individual VDC.

Subscribing to a business continuity service helps protects virtual machines operating in the customer's VDC from interruptions in the availability of the service providers' infrastructure.

With business continuity services enabled, the service provider can now respond to a disaster at the primary site, such as a network outage or power failure, by transitioning customer systems to run out of a secondary site, thereby minimizing the disruption to application availability. This transition, known as a "fail over", can be done on a per-customer, per-VDC, or per-VM basis. By doing so, business continuity services are implemented in a more orderly fashion from the perspective of the service provider and the cloud customer.

In one embodiment, a data processing system is therefore provided for hosting virtual machines in a cloud computing environment. A primary production cloud site, operated from a first location, provides a set of virtual machines to a set of customers. A second production site operates at a second location. The second location also operates as a continuity production cloud for the set of customers. A cloud management service both (a) maintains configuration of the set of virtual machines as one or more Virtual Data Centers (VDCs); and (b) permits selective enablement of a business continuity service for failing over selected elements of the production cloud to the continuity production cloud on a per-customer, per-VDC, or per-VM basis.

In specific implementations, additional features may include:

virtual data processors, firewalls, load balancers, and virtual local area networks as elements of the VDCs;

a replication service, provides data replication between the first and second locations;

a network interface, provides secure communication between the production and continuity clouds, such that the first customer is prevented from accessing production or continuity clouds provided for other customers; and if included, the replication service operating independently of the production cloud and the continuity cloud.

The cloud management service can further enable the first customer to specify Service Level Agreement (SLA) information including one or more of cost, Recovery Point Objective (RPO) and Recovery Time Objective (RTO).

The cloud management service can also further enable the first customer to specify which one of several possible data processing platforms at several locations are to provide the target production cloud for the first user. Optionally, in the event of a disaster;

network addresses are re-assigned;
firewall rules are updated;
virtual private networks are created;
load-balancing options are configured;
virtual local area networks are created;
standby network interfaces are activated;
a recover plan is executed for each continuity enabled VDC to bring online VMs as specified by the user in an order of recovery;
the recovered VM's are rebalanced.

Furthermore, in an event of a test, it is possible that:
virtual machine disks are cloned;
firewall rules are updated;
virtual private networks are created;
load-balancing options are configured;
virtual local area networks are created;
standby network interfaces are activated;
a recover plan is executed for each continuity enabled VDC to bring online VMs as specified by the user in an order of recovery; and
DNS updates are initiated for the recovered VM's.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 15 illustrates a sequence of steps performed in the event of a disaster.

FIG. 16 illustrates a sequence of steps performed at time of test.

DETAILED DESCRIPTION

Figure 1:
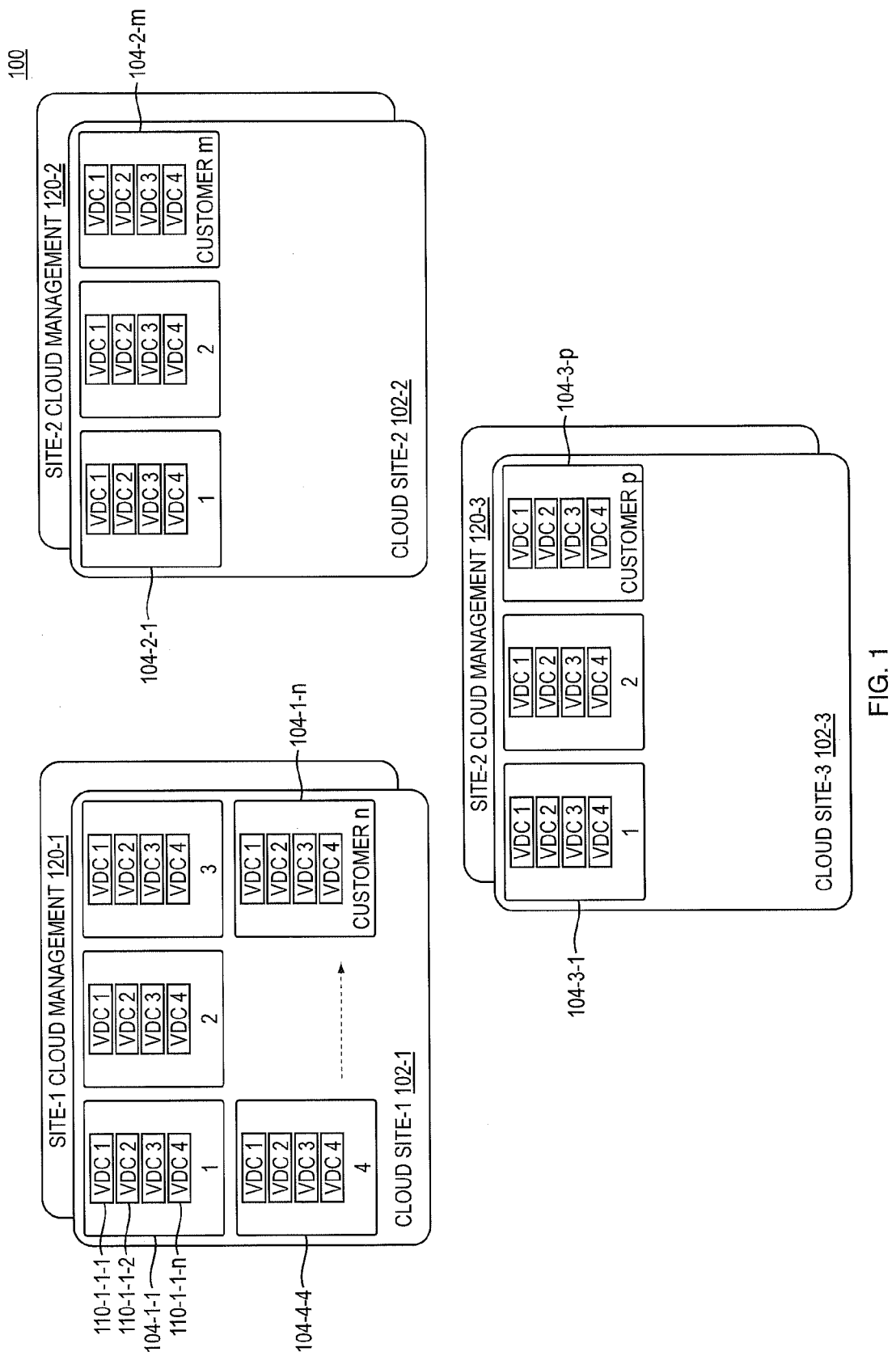
FIG. 1 is a high level diagram of a service provider who offers enterprise cloud services with optional business continuity to a number of customers.

FIG. 1 is a high level diagram of a typical cloud based information technology (IT) environment 100 in which improved business continuity procedures and apparatus described herein may be used. It should be understood that this is but one example cloud environment and many others are possible.

Of particular interest here is that users can request and configure business continuity services for enterprise cloud(s) on a per-VDC or per-VM basis. The business continuity service allows for site-to-site recovery across multiple data centers that can be placed at geographically diverse sites. By selecting this business continuity service, the customer can be assured that in the event of a failure of the physical infrastructure at given site, his enterprise cloud(s)—on a VDC by VDC basis—will be brought back online at another site according to a service level agreement (SLA). For example, as part of enabling the business continuity service for certain VDCs, the customer may specify a Recovery Time Objective (RTO) and Recovery Point Objective (RPO).

The business continuity service is made available to customers on a per VDC basis. Thus, after the customer specifies configuration of his VDC (including any virtual machines, firewalls, load balancers, etc.) he can then treat his entire VDC configuration as a single entity to which continuity services are applied. The service provider is then entirely responsible for configuring the details of replicating the VDC, managing that data that specifies the replication, isolating that detail from the customer, and bring the VDC back on line at the time of a disaster. Examples of conditions under which a disaster might be declared could include a network outage, power outage, or complete site failure.

More particularly now, the cloud environment 100 illustrated in FIG. 1 is operated by a cloud service provider. The environment 100 includes equipment located at several different physical locations or sites 102. For example, a first cloud site 102-1 may be located in Philadelphia, Pennsylvania, USA, a second cloud site 102-2 may be located in London, England, UK and a third cloud site 102-3 may be located in Pune, Maharashtra, India.

An example cloud site 102 is responsible for hosting infrastructure equipment that provides cloud services to many different customers. In the case of cloud site 102-1 there are n customers 104-1-1 through 104-1-n. Cloud site 102-2 is servicing m customers 104-2-1, . . . , 104-2-m, and cloud site 102-3 hosts p customers 104-3-1, . . . , 104-3-p. It should be understood that is often overlap in the customers here such that a given customer 104 can request cloud services from multiple sites 102-1, 102-2, and/or 102-3.

One type of cloud service provided is a Virtual Data Center (VDC) 110. An example VDC 110 may include many different types of virtual data processing resources such as virtual firewalls, virtual load balancers, virtual local area networks, virtual data processing machines, virtual memory, virtual disk storage, and software resources such as operating systems and applications. It should also be understood that although an example customer one 104-1-1 shown in FIG. 1 appears to have specified exactly four (4) VDCs (110-1-1-1, 110-1-1-2, . . . , 110-1-1-n) in reality any given customer 104-1-1, . . . , 104-3-p may have more or less than the four VDCs than are illustrated in FIG. 1.

The VDCs 110-1 served from site one 102-1 for customer one 104-1 serve as a production cloud for specific customers 104-1-1, 104-1-2, . . . , 104-1-n. Likewise, the VDCs 110-1 served from site two 102-2 for other customers 104-2-1, 104-2-2, . . . , 104-2-m serve as a production cloud for those other customers 104-2-1, 104-2-2, . . . , 104-2-m.

The VDCs 110 include virtual computing resources that are physically implemented at each particular service provider site 102 but are remotely accessed by the respective customers 104 over network connection(s). The service provider thus operates a number of physical machines at the various provider sites 102-1, 102-2, 102-3 including networking equipment such as switches, routers, and other types internetworking equipment such as physical firewalls, and multiple physical data processors, storage servers, storage area networks, and other data processing machines as needed to provide the functions required by the VDCs 110. The details of configuration and operation of this physical data processing equipment are hidden from the customers 104; this data processing model sometimes referred to as Infrastructure as a Service (IaaS).

An administrative user typically associated with each service customer 104 does however have access to a cloud management function 120 at one or more sites 102. The cloud management interface allows administrative users to interact with and configure the elements of their VDCs available to them from the cloud site 102 as well as additional services. Cloud management components at least some of which are located each cloud site 102 may also be provided from a central location (not shown in FIG. 1). For example, the service provider may allow each customer to use the cloud management interface 120 to specify policies or other services on a per customer, per VDC or per virtual machine basis.

An example of a custom service policy might be a backup policy that schedules backups of all virtual machines (VMs) at a given time each day for example at midnight Pacific Standard Time (PST) each day.

As will be understood from the description below, the business continuity service offered by the service provider in the environment 100 allows each customer to specify optional services to be provided on a per VDC 110 basis. One of the services of interest is a business continuity service that enables a selected VDC to be brought back on line at an alternate site 102-2, 102-3 in the event that a selected cloud site 102-1 fails, goes off-line, or otherwise becomes unavailable.

Figure 2:
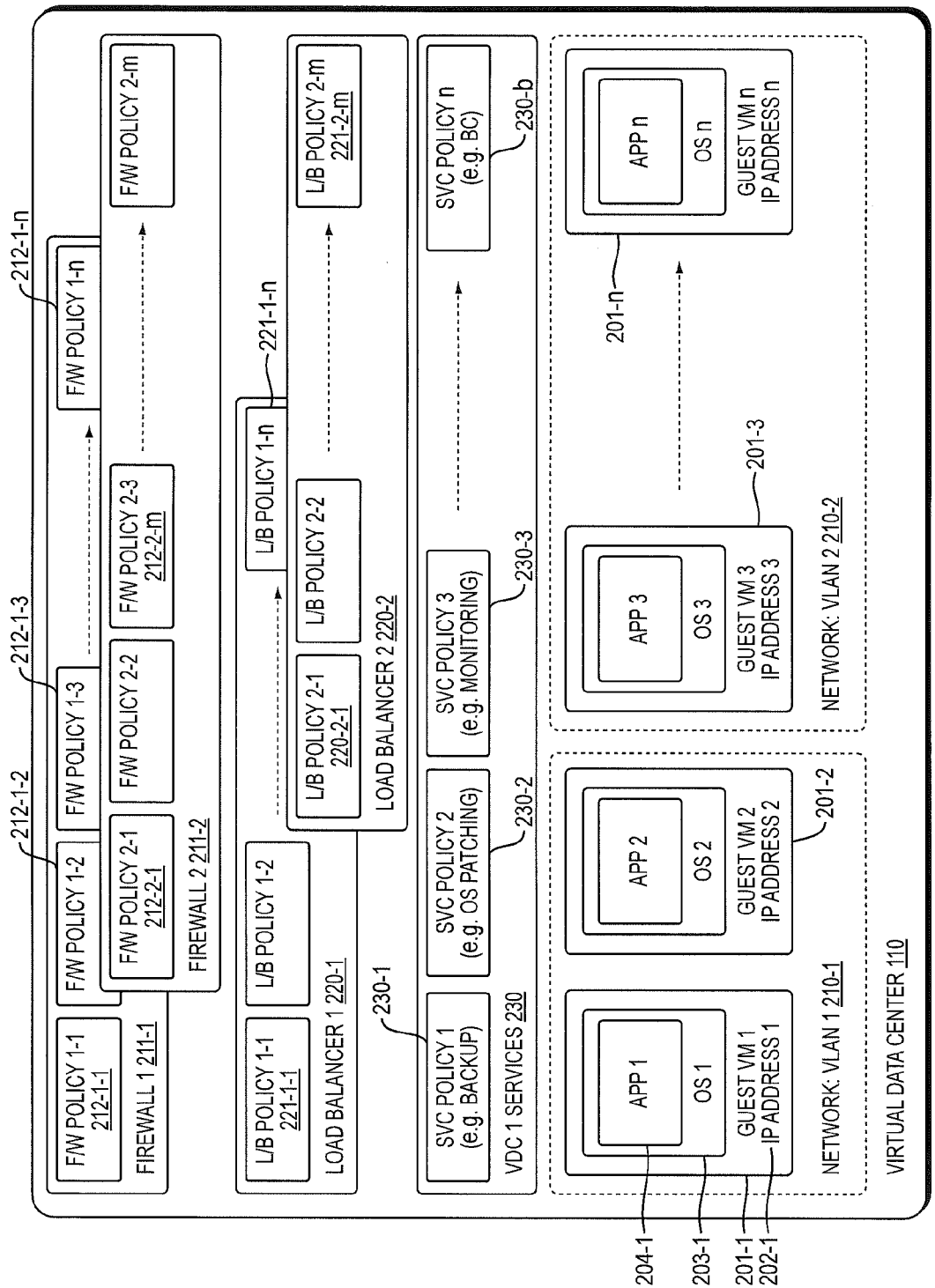
FIG. 2 illustrates a Virtual Data Center (VDC) in more detail.

A typical VDC is shown in more detail in FIG. 2, and includes a number of virtual machines 201-1, 201-2, 201-3, ..., 201-n. An example VM 201 has associated with it a network address such as an Internet Protocol (IP), an operating system 203, and one or more applications 204. The VMs 201 may be further interconnected into one or more Virtual Local Area Networks (VLANs) 210-1, 210-2.

Although FIG. 2 illustrates a single operating system 203 and single application 204 for each VM 201 it should be understood that multiple operating systems 203 and multiple applications 204 may be implemented in each VM 201.

The example VDC 110 also may have one or more virtual firewalls 212, virtual load balancers 221 and other services 230.

Virtual firewalls 211-1 and 211-2 may each have a number of associated policies 212-1-1, ... 212-2-m.

Likewise, the virtual load balancers 220-1 and 220-2 also have associated policies 221-1-1 through 221-2-m.

The services 230 associated with each VDC 110 are selectively chosen by the customer and specified via cloud management 120. The service provider may choose to charge additional fees for activating these optional services. For example a given VDC 110 may have a backup policy 230-1, and operating system patching policy 230-2, and monitoring policies 230-3. Of interest herein the customer can specify a business continuity (BC) policy 230-4 on a per-VDC basis.

Figure 3:
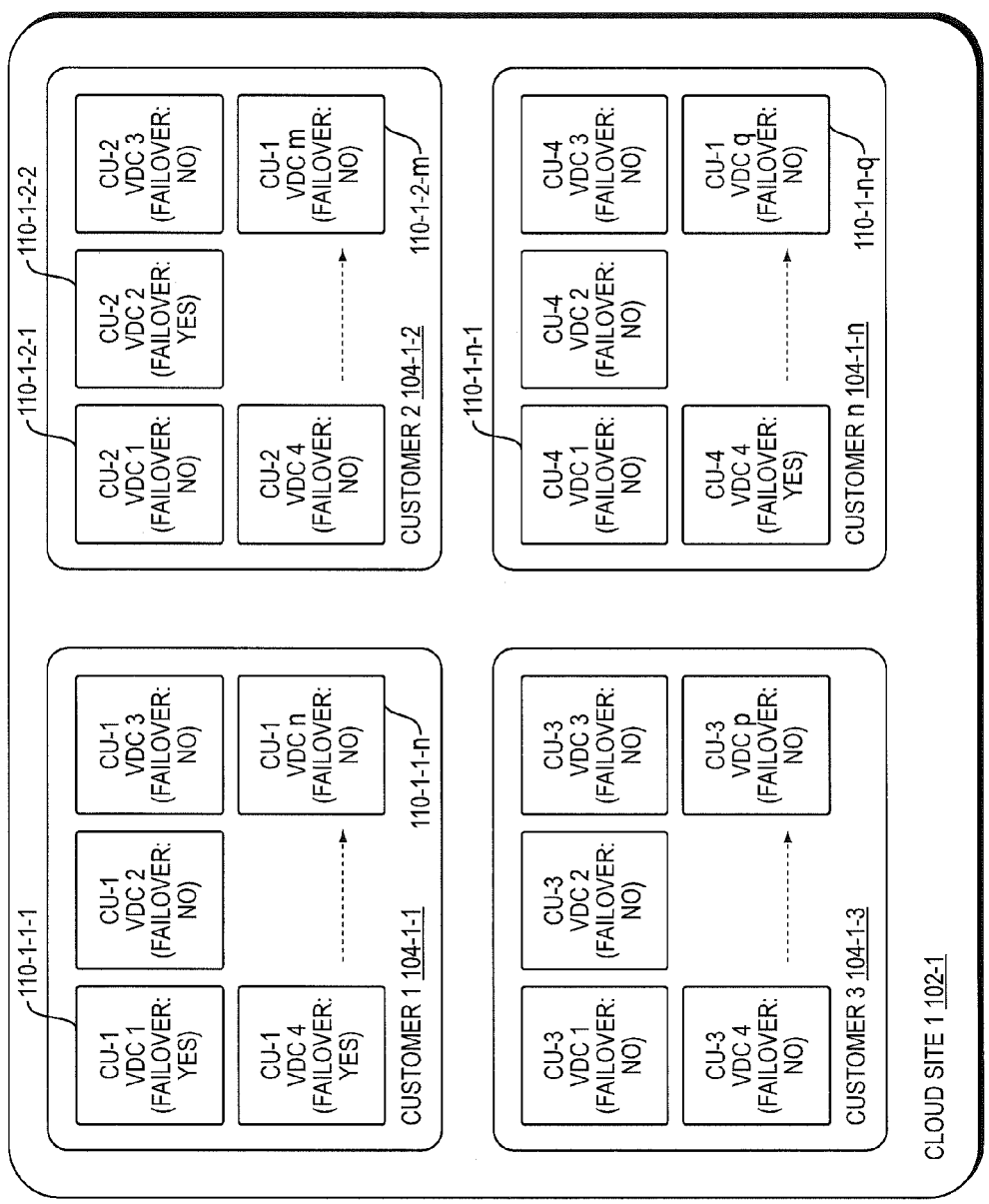
FIG. 3 is a data structure maintained by the service provider to represent information concerning which VDCs have associated business continuity services enabled.

FIG. 3 is a high-level conceptual diagram of an example cloud site one 102-1 and how the customers 104-1-1, 104-1-2, 104-1-3, and 104-1-n it is responsible for have specified business continuity services for each of their respective VDCs. In this example, customer one 104-1-1 of cloud site one 102-1 has specified that business continuity services should be enabled for his VDC 1 (110-1-1-1) and his VDC 4 (110-1-1-4) but not for his other VDC 2, VDC 3, and VDC n.

Similarly, customer two 104-1-2 has specified that business continuity services should be enabled for his VDC 2 (110-1-2-2) but not for any of his other VDC 1, VDC 3, VDC 4, ..., or VDC m.

Information concerning which VDCs have business continuity services enabled is maintained in the cloud management information 120-1 associated with each site 102 as will be described in more detail below.

What is important to recognize here is that each customer 102 specifies, on a per VDC basis, and not on a lower level (such as a per-VM basis) or on a high level (such as a per customer basis), the enablement of business continuity services.

Figure 4:
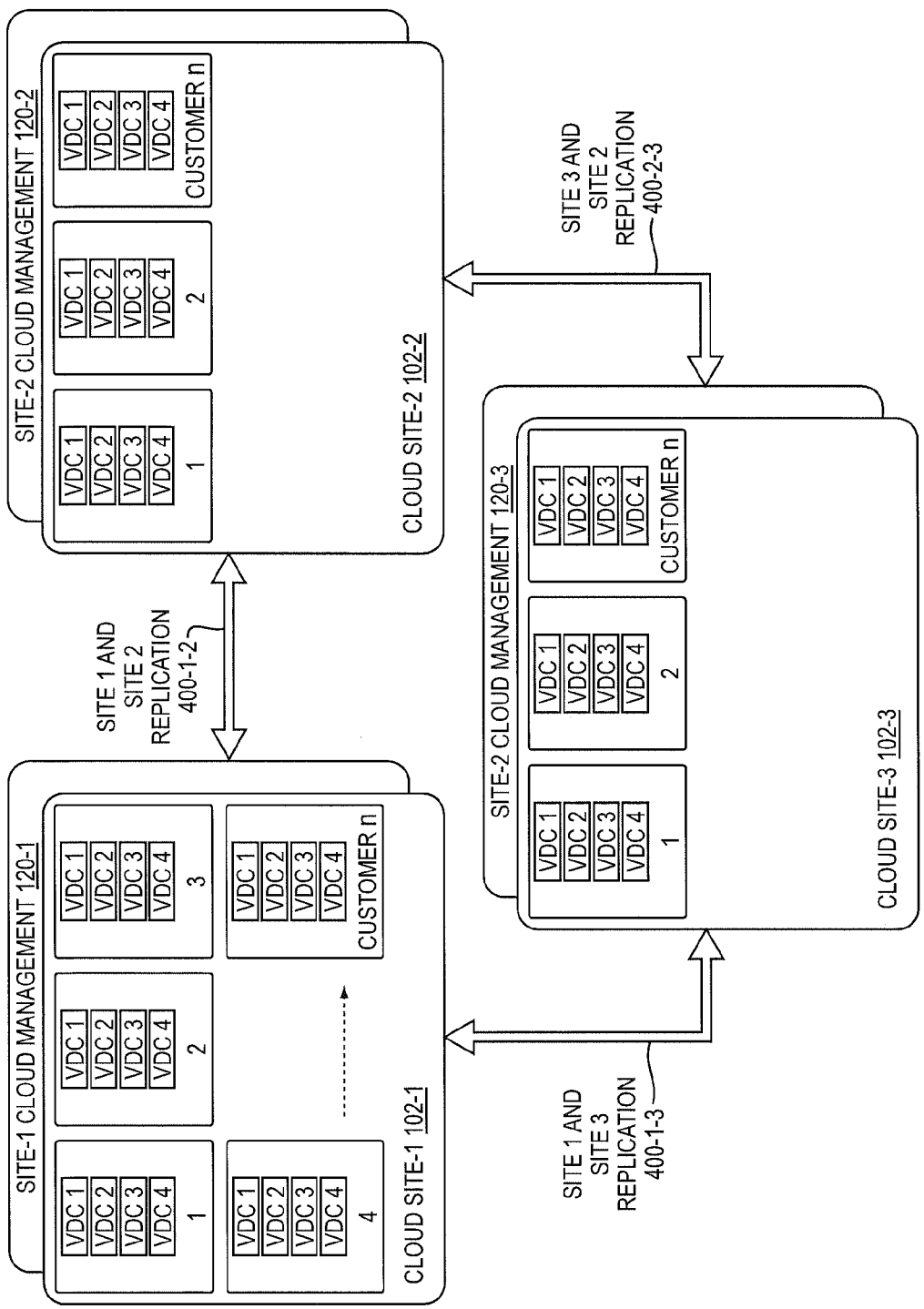
FIG. 4 illustrates replication services implemented between various sites.

FIG. 4 is a diagram similar to that of FIG. 1 but illustrating that to provide the requested business continuity services there are replication services put in place between the various cloud sites 102. For example, a first replication service 400-1-2 operates to replicate information between site one 102-1-2 and site two 102-2, a second replication service 400-2-3 replicates data between site two 102-2 and site three 102-3, and a third replication service 400-1-3 replicates data between site one 102-1 and site three 102-3. These replication services can be implemented using any convenient replication technology, but operate independently of the customers 104 and other operations of the sites 102.

Figure 5:
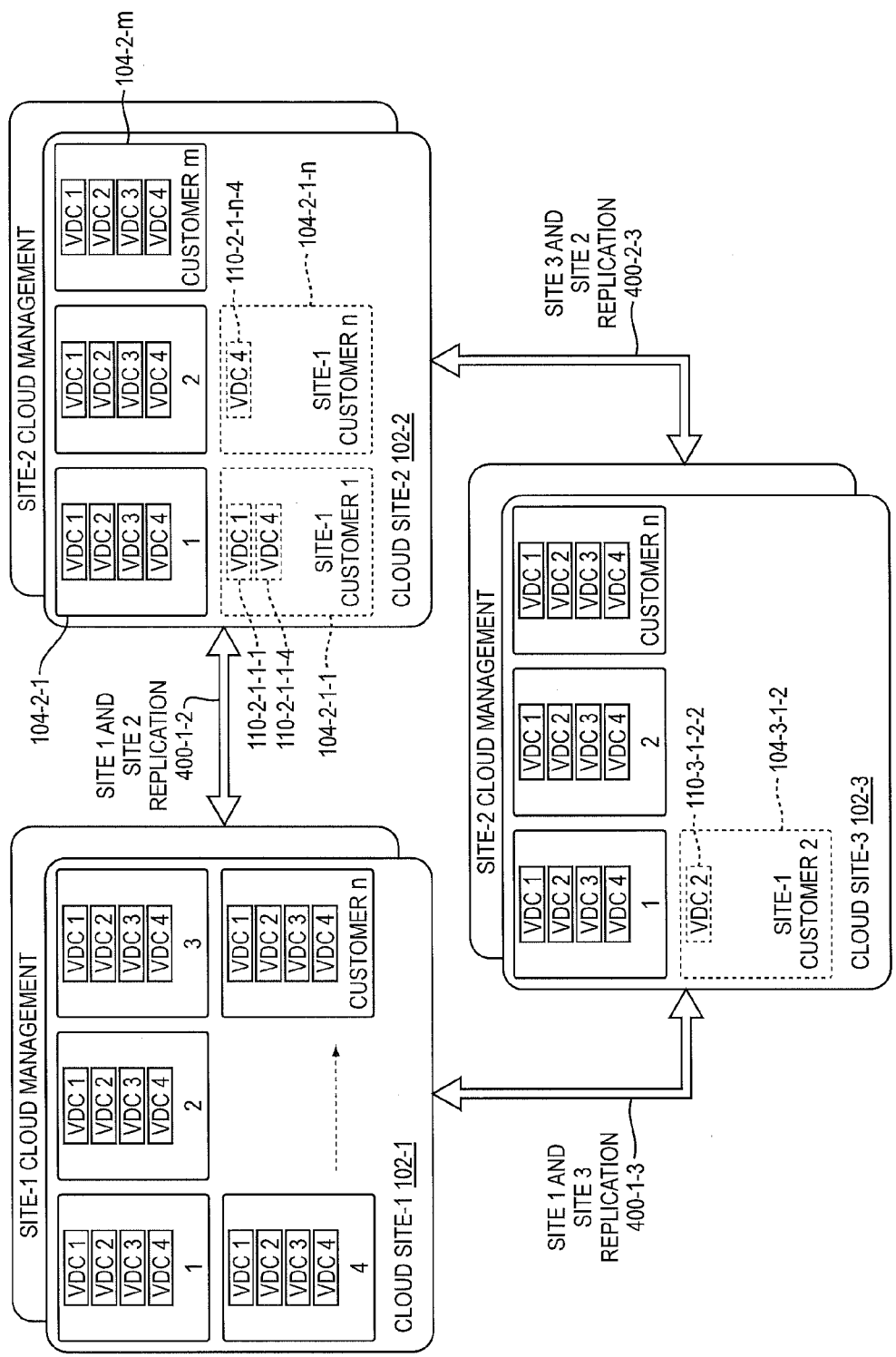
FIG. 5 shows a result of operating replication services is to store VDC replicas at failover sites.

FIG. 5 shows the outcome of implementing these replication services. As mentioned above, customer one 104-1 has requested that his VDC 1 and VDC 4 have business continuity services enabled; likewise customer two 104-2 has requested that only his VDC 4 be subjected to the business continuity service. As a result, due to the operation of replication services 400-1-2 and 400-1-3, the VDC 1 and VDC 4 belonging to customer one 104-1 at cloud site one 102-1 will eventually be replicated at cloud site two 102-2. Similarly, another customer n 104-n of site one 102-1 will have his VDC 4 replicated at site two 102-2. Also apparent in FIG. 5 is that site one 102-1 has a customer two 104-1-2 that has requested business continuity services for his VDC 2, but that site three 102-3 be used for this. So the replication service 400-1-3 causes an image of his VDC 2 to be created at site three 102-3 as VDC image 110-3-1-2.

These replicated VDCs (110-2-1-1-1, 110-2-1-1-4 and 110-2-1-n-4) will exist as images (e.g., as replicas or dormant copies) and will not yet be in an active production mode; this fact is indicated by the use of dashed lines in FIG. 5. As with the prior figures, the VDC shown with solid lines are used to indicate that those VDCs are in an active production mode.

It is therefore the case that while site one 102-1 serves as a production cloud for customer one, that customer one also has access to one or more other sites, such as site two 102-2. These other sites serve as a business continuity cloud for customer one from which selected VDCs will be served in the event of a failure at site one. These other sites also serve as primary production clouds for other customers at the same time.

As a further option specified to cloud management 120-1, customers can specify at which site their respective business continuity elements are located; this option can be specified on the same user interface screen when the administrative user specifies the configuration of his corresponding business continuity services for each VDC.

Also at this cloud management configuration screen (to be shown in detail below), a customer can specify further aspects of the business continuity service such as Recovery Time Objective (RTO) and Recovery Point Objective (RPO), according to an available Agreement (SLA) entered into between the customer and the service provider. These SLA parameters will dictate how often the replication services 400 store and update the images of the various VDCs as well as how quickly they much be brought into production mode in the event of a disaster.

Figure 6:
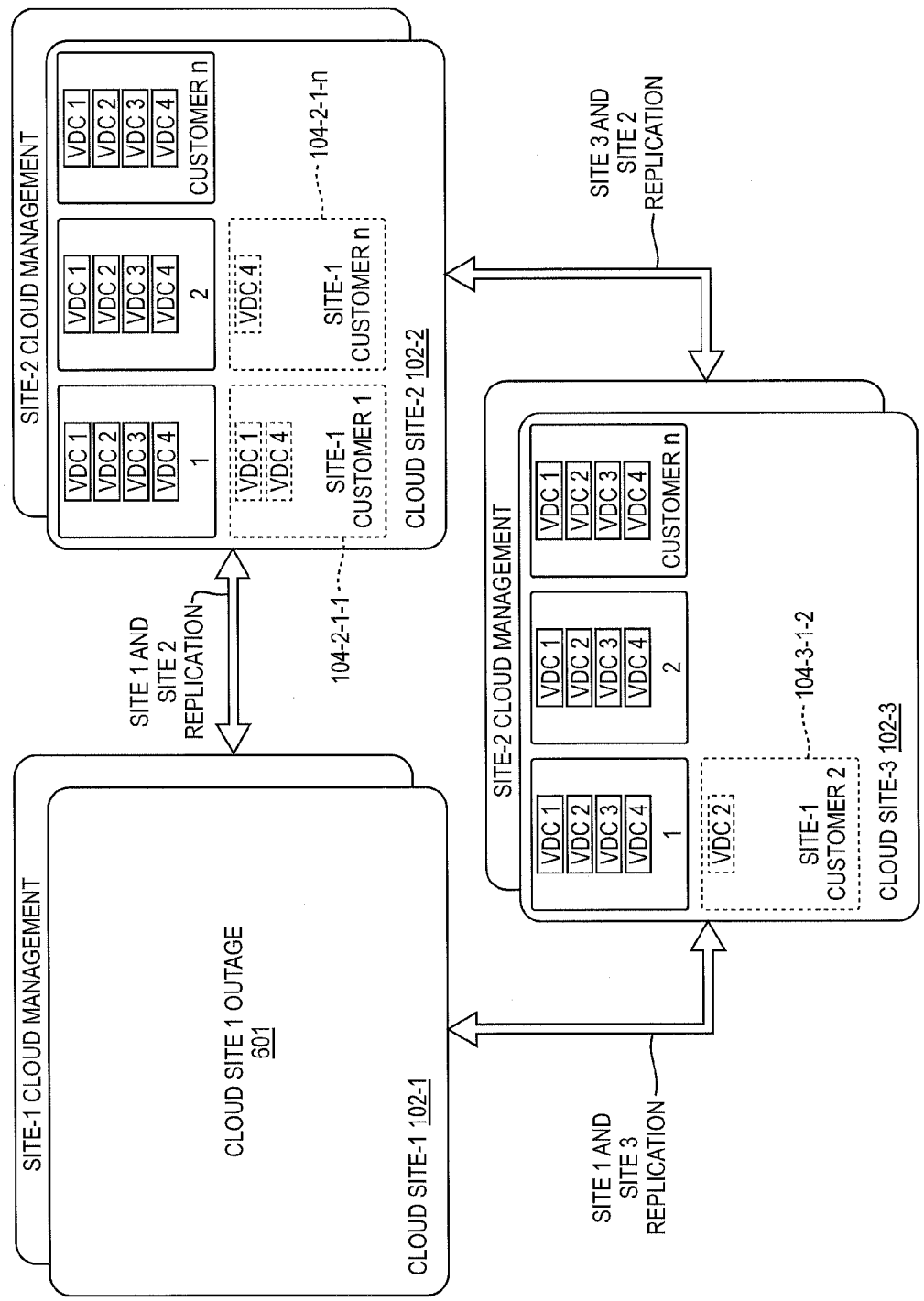
FIG. 6 shows the state immediately after an outage at cloud site one.

At a time illustrated in FIG. 6, site one 102-1 is now experiencing an outage 601 of some type that makes it unavailable to customer one 104-1 and other customers. When cloud site one 102-1 goes down, these associated customers may be notified of the outage in a manner that has been pre-arranged such as by e-mail, mobile text message, phone call etc.

Figure 7:
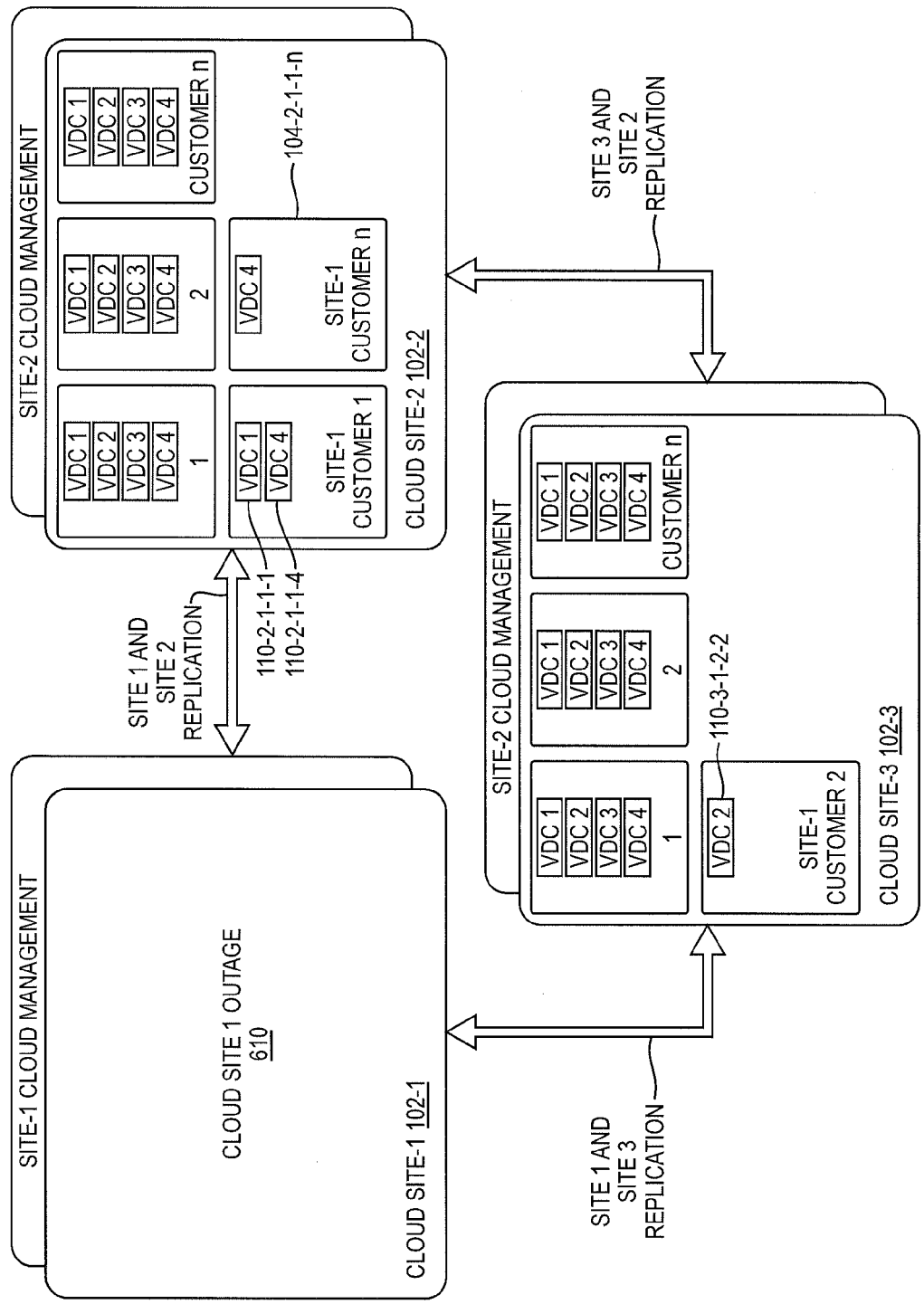
FIG. 7 illustrates the state after the backup VDC images are promoted to production mode.

Initially, as indicated in FIG. 6, there is no change in the operational state of the other sites 102-2, 102-3. This may be because the other sites are operating normally, or some time is permitted for the outage to resolve itself at the primary site. However, eventually a point is reached in FIG. 7 where the VDCs for site one customer one 104-1-1 and site one customer n 104-1-n are brought online at cloud site two 102-2. Also at this time the VDCs for site one customer two are brought on online at cloud site three 102-3. With these VDCs brought back in production mode, the customers 104-1, 104-2 are again sent a notice, this time that their VDCs (e.g., VDCs 110-2-1-1-1, 110-2-1-1-4, ..., 110-2-n-1-4, 110-3-1-2-2) are brought back online at the respective alternate sites 102-2, 102-3.

Figure 8:
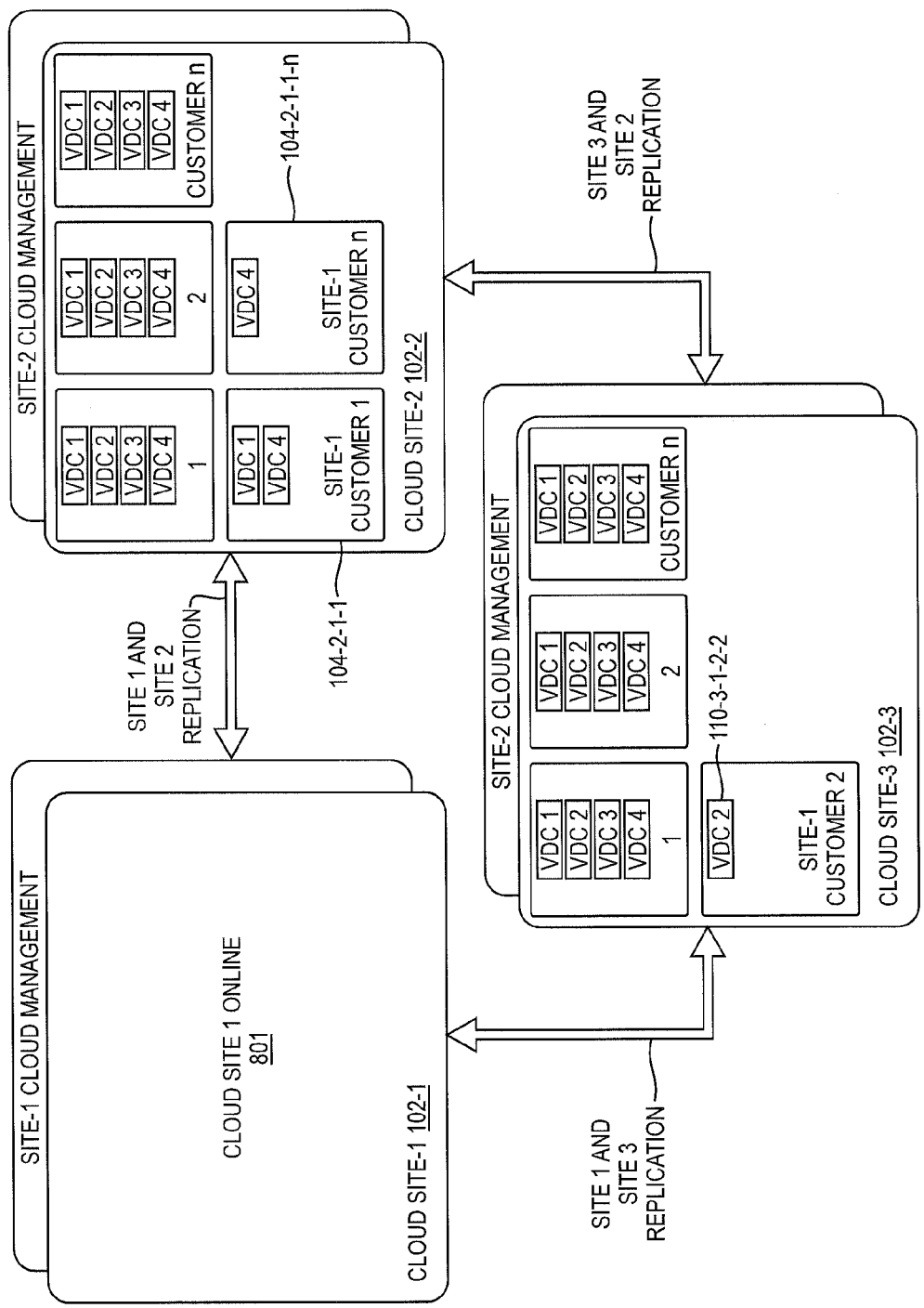
FIG. 8 illustrates an initial state one a cloud site is brought back on line.

In a next state, as shown in FIG. 8, a point might be reached where site one 102-1 again comes back online. At this point, site one 102-1 is not yet hosting any production VDCs as it does not yet have access to the information needed to bring them back online, and therefore customer one 104-1 and customer two 104-2 continue to have their VDCs hosted from the alternate locations 102-2, 102-3.

Figure 9:
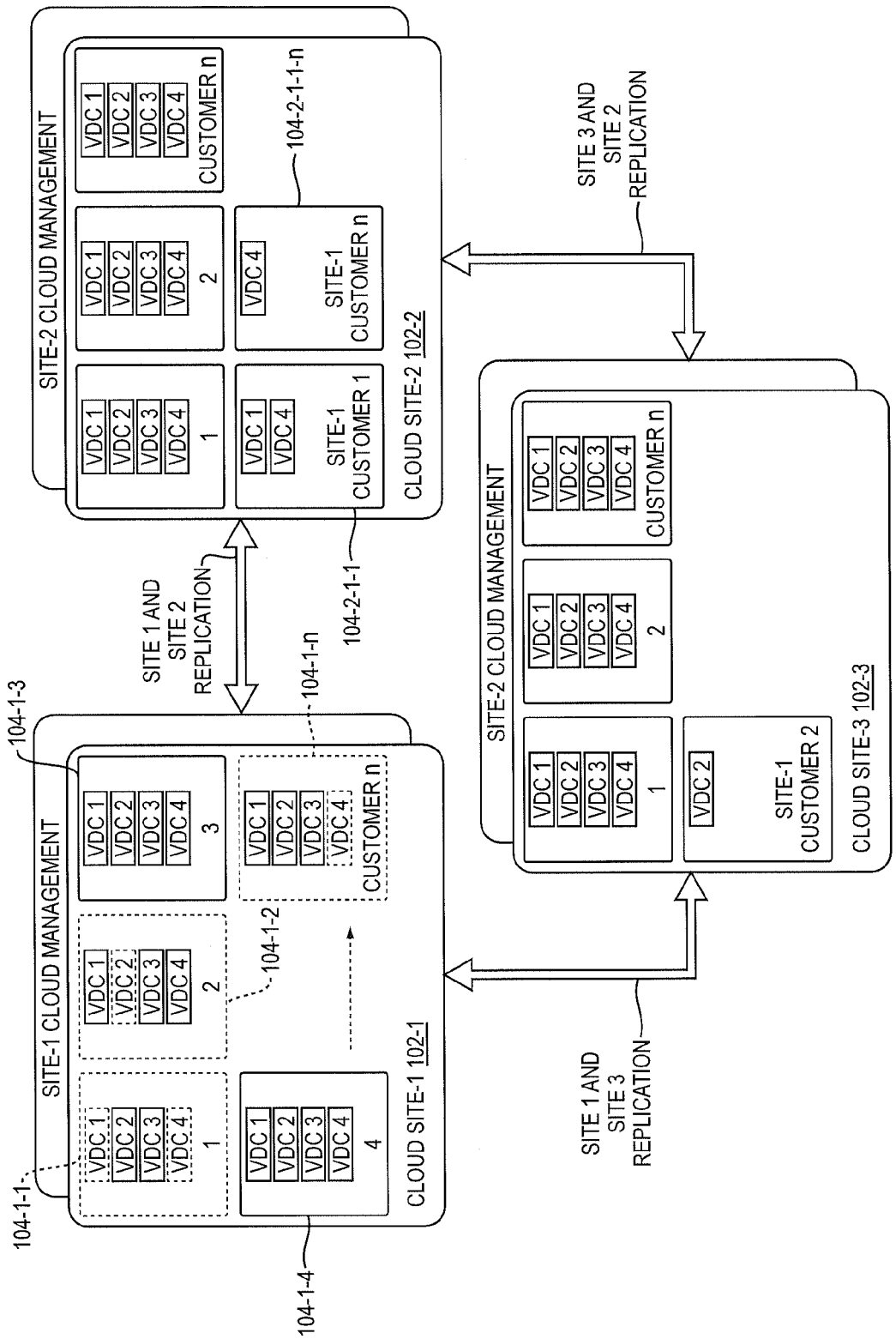
FIG. 9 is an intermediate state after the cloud site is brought online but where some of the VDCs are still serviced from the backup site.

Eventually a state is reached as shown in FIG. 9 where at least some information needed to begin to bring VDCs back on line is available to site one 102-1. In this state, the images of VDCs for which business continuity was not requested can be obtained such as from backups or configuration information associated with cloud site one 102-1. These VDCs, shown with the solid lines (e.g., VDC 2 and VDC 3 for site one's is customer one 104-1-1, VDC 1, VDC 3 and VDC 4 for site one's customer two 104-1-2, and VDC 1, VDC, 2, VDC 3, for site one's customer n 104-1-n, etc.) are thus brought into production mode in this state.

VDCs for which business continuity was selected are however still not yet brought in production mode on site one 102-1 but remain as images. These must first be brought over via the replication service 400-1-2, 400-1-3 as replicas or images from the corresponding locations at which they have continued to operate in production mode during the outage of site one 102-1.

In the state shown in FIG. 9, the VDC images for which business continuity was not selected can simply be sourced from a local copy of the configuration files and rebooted, because those VDCs were expected to go offline during the outage. However, images for which the business continuity service was selected are only brought back online when a current image is successfully transferred from the respective backup cloud sites 102-2, 102-3. Thus, in the state indicated in FIG. 9, customer one 104-1 has his VDC 1 and VDC 4 still active at site two 102-2 and customer two still has his VDC 2 active at site three 102-3, but the VDC images are successfully copied to site one 102-1.

Figure 10:
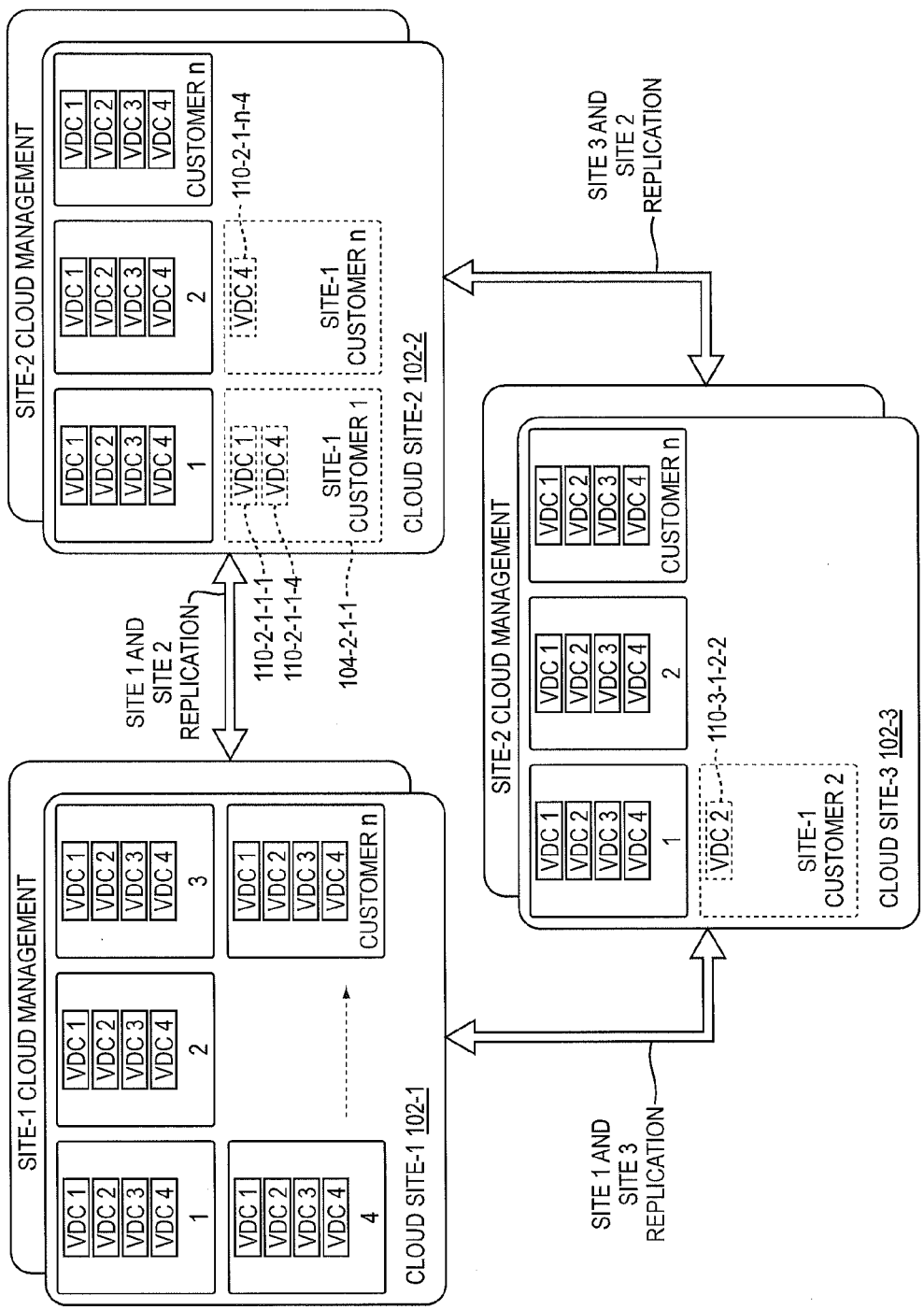
FIG. 10 is the state after all VDCs are again active at the original site.

FIG. 10 illustrates a state where the VDCs for customer one are again in production mode on site one 102-1 and the corresponding images can remain in the dormant state on site two 102-2. Likewise customer two 102-2 and customer n 102-n is again actively serviced from site one 102-1, and their respective sets of VDC images (110-3-1-2-2 and 110-2-1-n-4) are being maintained as copies in the backup sites 102-2, 1023. Replication services will again maintain these images as changes are made to the corresponding production VDCs according to the service-level agreements in place.

Figure 11:
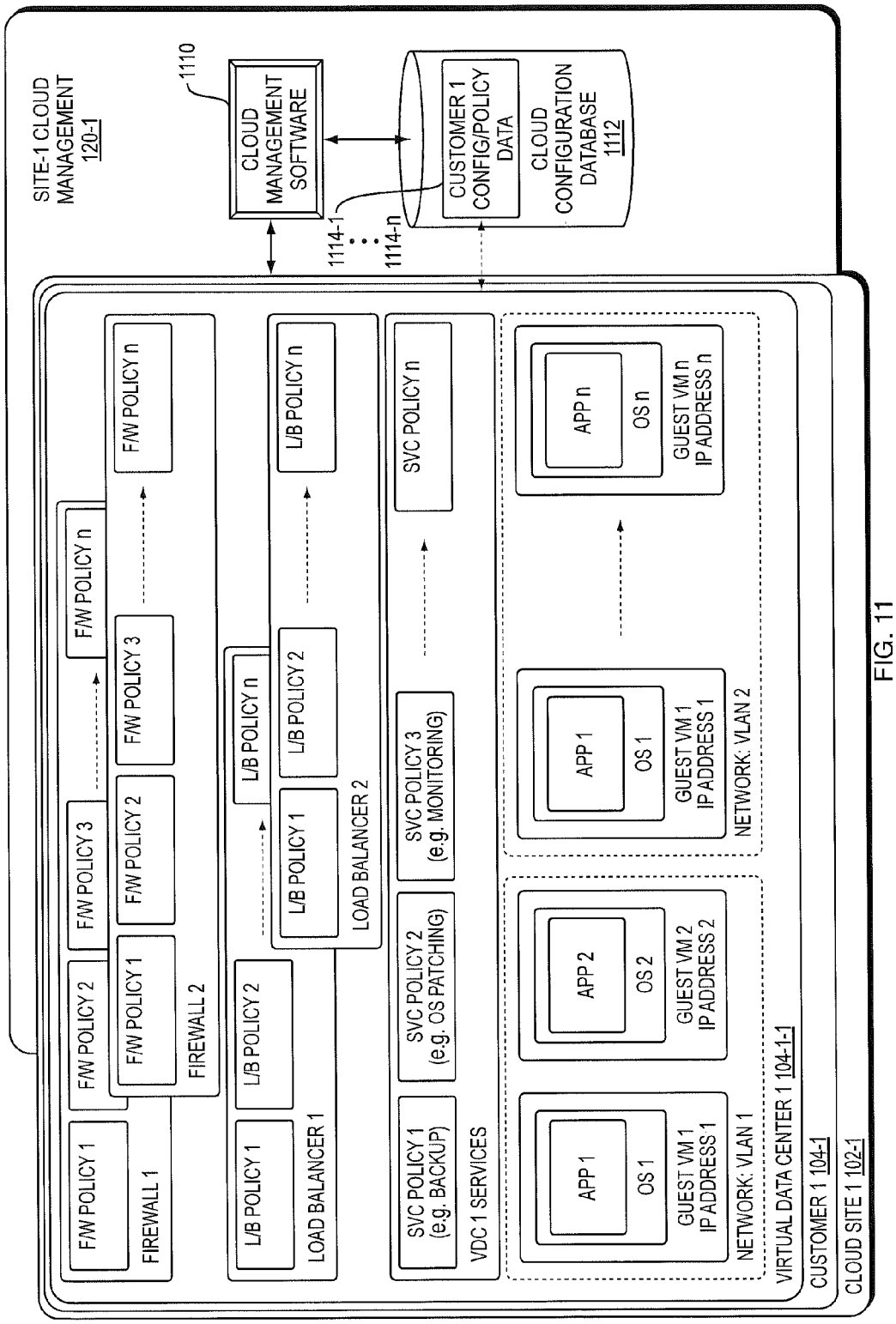
FIG. 11 shows the cloud management database in more detail.

FIG. 11 is a more detailed view of the cloud management function 120-1 deployed at typical cloud site one 102-1. One set of information maintained by cloud management 120-1 is the configuration and policy data 1114-1, . . . , 1114-n associated with each customer 104-1, . . . , 104-n serviced by site 102-1. The configuration data includes information concerning the configuration of the customer's virtual machines, such as initial configuration information, for each machine in each VDC specified by that customer. The policy data concerns the configuration details for the firewalls, load balancers, and other machines in the VDC that require policy-based configuration, as well as selected service policies specified by the customer. Information stored in the cloud configuration database 1112 is obtained using various user interfaces that will be described below.

Figure 12:
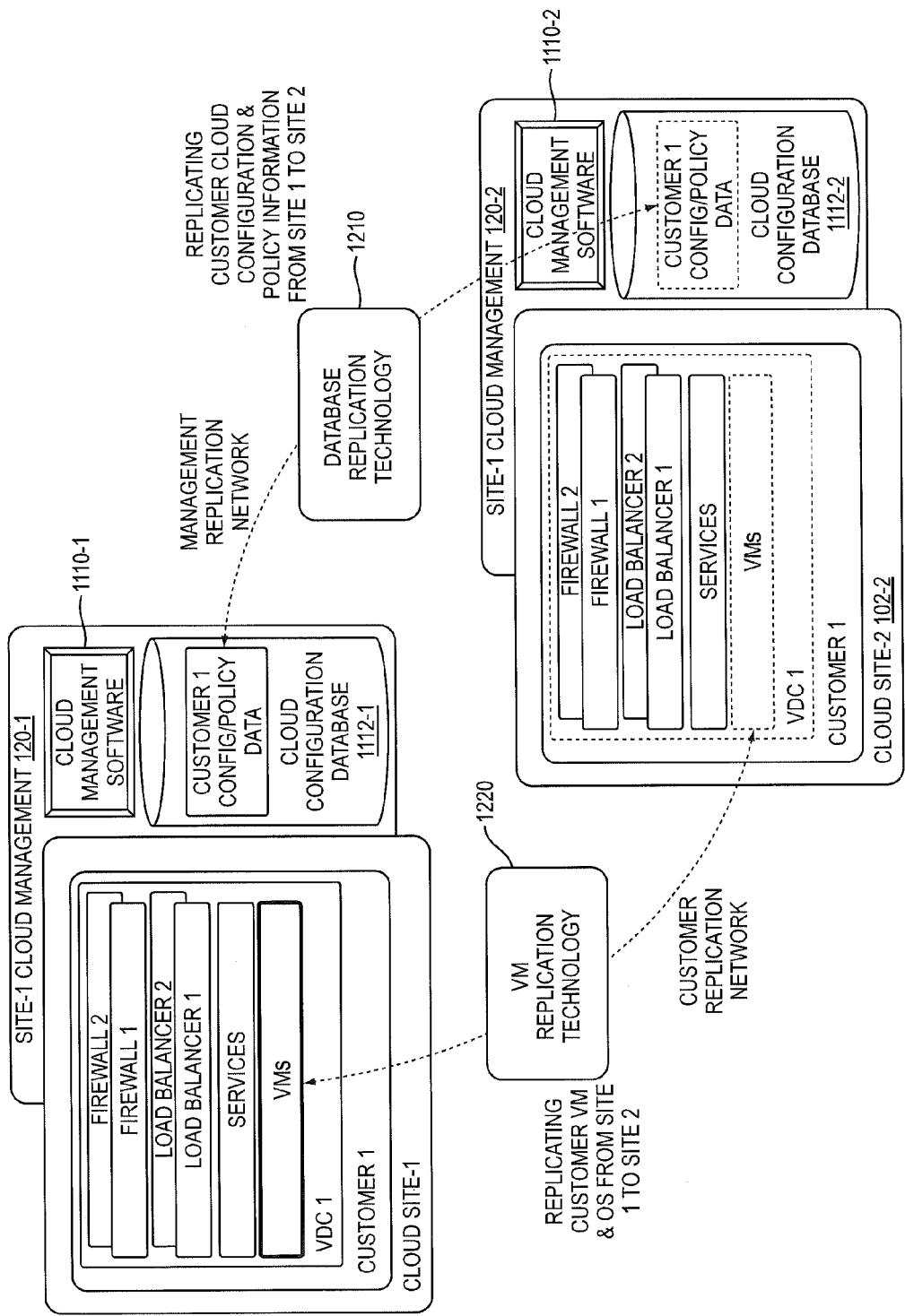
FIG. 12 illustrates detail of how replication occurs between two sites.

FIG. 12 illustrates in more detail how replication service 400-1-2 may operate to replicate data from cloud site one 102-1 to site two 102-2. In general, two things occur independently of one another—configuration and policy data for the various VDCs is replicated separately from the virtual machine state information. The two different replication functions can be performed by two different replication technologies.

For example a virtual machine replication technology 1220 can be responsible for replicating virtual machine definition files between the cloud sites; keeping in mind that this is performed on a per VDC basis as specified by the customer policies stored in configuration policy database 1112-1. A database replication technology 1210 is responsible for replicating the policy information (which typically changes on a much less frequent basis than the VM state information).

Figure 13:
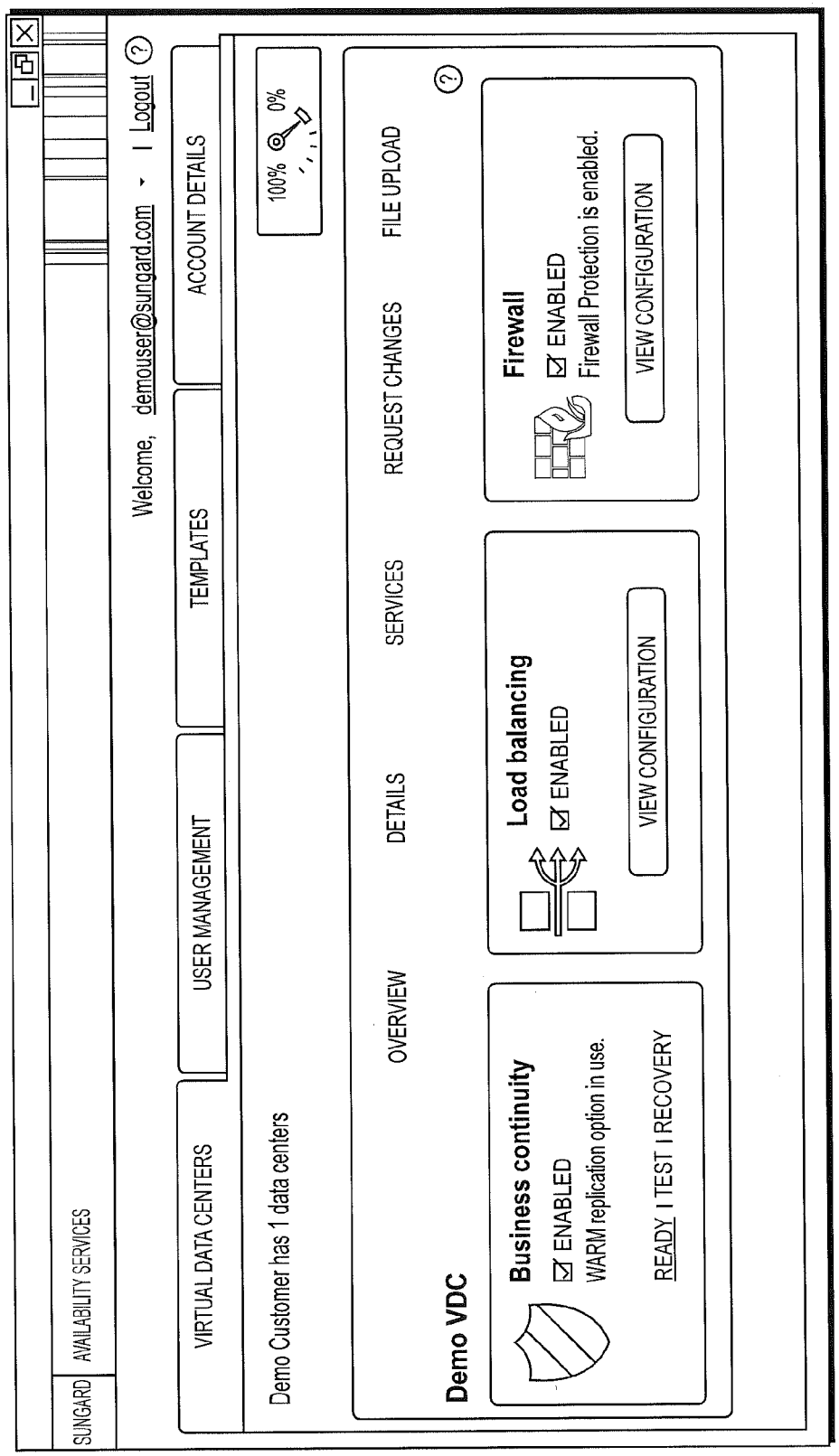
FIG. 13 is an example user interface for specifying business continuity options.

FIG. 13 shows a screenshot of an example cloud service dashboard that presents a set of services that are available to customers, and information related to the services. In use, a customer logs into the cloud configuration manager 120-1 at his primary site 102-1 (e.g., by entering a username and password). The cloud manager 120 then provides access to a cloud service dashboard for a VDC employed by the customer. One of the offered services is a "business continuity" service; in the example shown, the offered service is shown as graphical icon accompanied by an empty checkbox and the text "disabled." The cloud service dashboard also shows other subscribed services called "load balancing" and "firewall," respectively, to the customer.

In another convenient embodiment, for each service shown by the cloud service dashboard, the cloud service dashboard also shows a customer the terms and conditions of an associated Service Level Agreement (SLA) that specifies the RPO and RTO that will dictate operation of the replication and recovery processes described above. Alternatively, the cloud service dashboard may send copies of the service level agreements to the customer so that the customer can view them later in time.

In yet another convenient embodiment, the cloud service dashboard is provided to the customer as a webpage. The webpage may be transmitted to the customer from a server residing in a management network operated by the cloud service provider.

Once the business continuity service is configured, the cloud service dashboard shows that the customer has successfully subscribed to the business continuity service such as by showing a filled-in checkbox and accompanying text "enabled".

Figure 14:
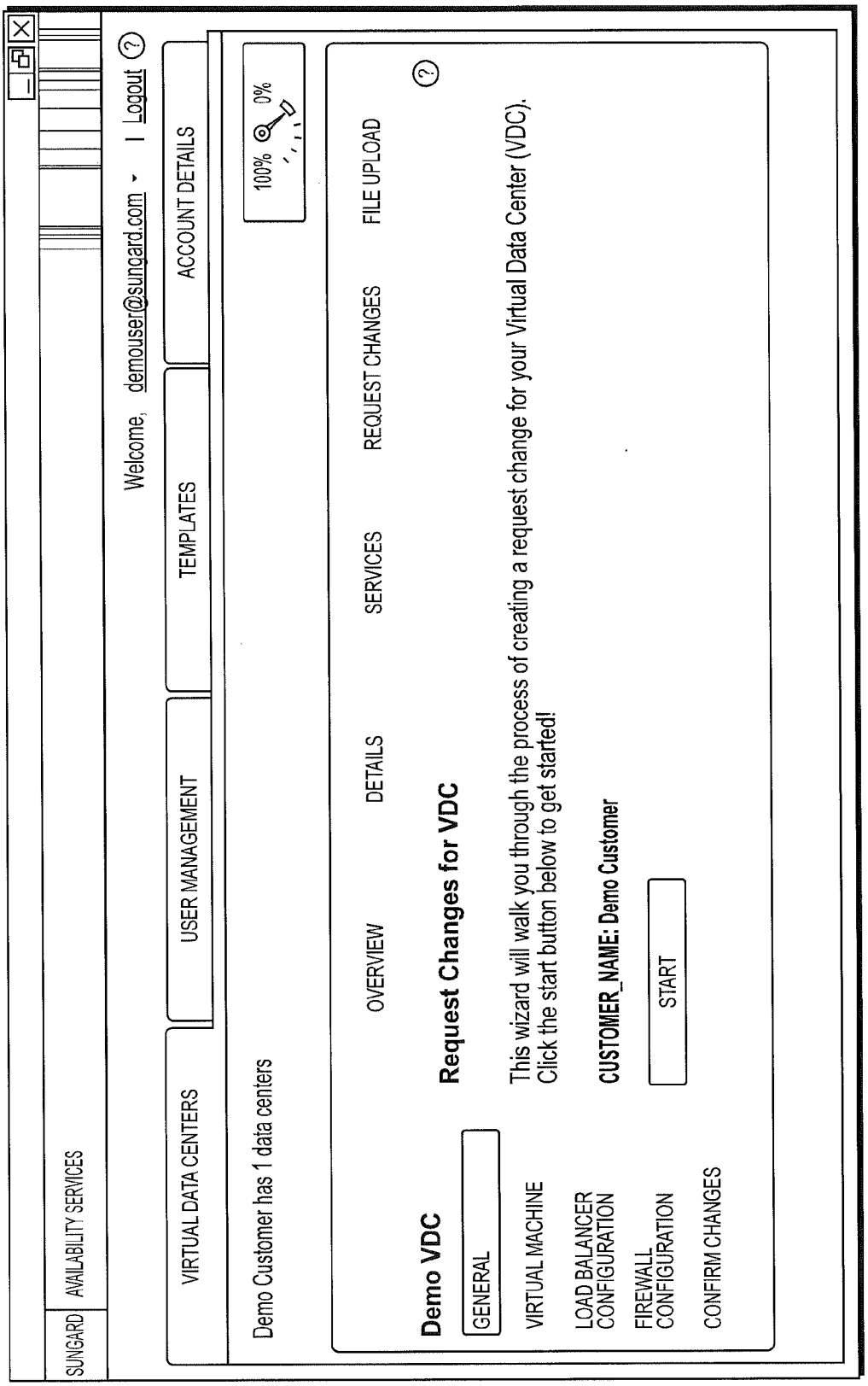
FIG. 14 is a user interface for configuring a virtual data center in the enterprise cloud.

FIG. 14 is an example user interface screen where the configuration of a VDC 110 may be specified.

More information about using the dashboard model for configuration and selecting options for the enterprise cloud are described in a co-pending U.S. patent application Ser. No. 61/591,461 entitled "Cloud Services Dashboard" filed Jan. 27, 2012, the entire contents of which are hereby incorporated by reference.

FIG. 15 illustrates a more detailed sequence of steps that are carried out at the service provider locations in the event of a disaster such as a cloud site outage of FIG. 6. In a first step, Internet Protocol (IP) addresses are re-assigned for both management and backup interfaces. This is necessary so that network addresses previously directed to infrastructure at the enterprise site 100 are diverted to the business continuity site 130.

In a second step, customer firewall rules at the continuity site are updated based on the policies that have stored in the cloud configuration database 1112.

In a third step, virtual private networks are then created.

In a fourth step, load-balancing options selected by the customer are configured based on the policies they have specified.

The next step is to implement the recovery plan for the customers VDCs. This is created according to an order of recovery of virtual machines as has been previously specified by the customer. For example, the customer may want to recover a database VM before an e-commerce server VM. The recovery plan is hen carried out to cover the individual virtual machines.

In an eighth step, the recovered VM's are rebalanced according to load balancing options that the customer has specified.

In the ninth step, the customer may connect to test his virtual machines at the continuity site, to ensure that the recovery operation has been successful. This can be provided in a couple of ways, such as by standard connectivity through IP SEC and/or site to site connections. At this point the customer may also initiate directory name service (DNS) updates.

In a final step, management services are reconfigured for the recovered virtual machines.

FIG. 16 illustrates a sequence of steps that may be carried out at time of test (ATOT). Such a test may be performed by the customer before an actual outage, to ensure the orderly recovery.

In a first step firewall rules may be updated.

In a second step, customer VPN connections may be created.

Next, any required load balancers specified by the customer may be created and configured.

Then, any VLANs also specified by the customer may be created.

Next, the recovery plan for the customer has been also specified; thus VMs can be then be recovered based on the recovery plan.

Any rebalancing of virtual resources among physical infrastructure can then be performed.

Next, the customer can then connect to test his virtual machines using standard connectivity options and may optionally initiate DNS updates.

Replication between source and target machines can then be re-enabled.

Finally, finally load-balancers, firewalls, and recovered VMs can be deleted after resynchronization has been completed.

It should be understood that the example embodiments described above may be implemented in many different ways. In some instances, the various "data processors" described herein may each be implemented by a physical or virtual general purpose computer having a central processor, memory, disk or other mass storage, communication interface(s), input/output (I/O) device(s), and other peripherals. The general purpose computer is transformed into the processors and executes the processes described above, for example, by loading software instructions into the processor, and then causing execution of the instructions to carry out the functions described.

As is known in the art, such a computer may contain a system bus, where a bus is a set of hardware lines used for data transfer among the components of a computer or processing system. The bus or busses are essentially shared conduit(s) that connect different elements of the computer system (e.g., processor, disk storage, memory, input/output ports, network ports, etc.) that enables the transfer of information between the elements. One or more central processor units are attached to the system bus and provide for the execution of computer instructions. Also attached to system bus are typically I/O device interfaces for connecting various input and output devices (e.g., keyboard, mouse, displays, printers, speakers, etc.) to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

The computers that execute the processes described above may be deployed in a cloud computing arrangement that makes available one or more physical and/or virtual data processing machines via a convenient, on-demand network access model to a shared pool of configurable computing resources (e.g., networks, servers, storage, applications, and services) that can be rapidly provisioned and released with minimal management effort or service provider interaction. Such cloud computing deployments are relevant and typically preferred as they allow multiple users to access computing resources as part of a shared marketplace. By aggregating demand from multiple users in central locations, cloud computing environments can be built in data centers that use the best and newest technology, located in the sustainable and/or centralized locations and designed to achieve the greatest per-unit efficiency possible.

In certain embodiments, the procedures, devices, and processes described herein are a computer program product, including a computer readable medium (e.g., a removable storage medium such as one or more DVD-ROM's, CD-ROM's, diskettes, tapes, etc.) that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transient machine-readable medium may include read only memory (ROM); random access memory (RAM); magnetic disk storage media; optical storage media; flash memory devices; and others.

Furthermore, firmware, software, routines, or instructions may be described herein as performing certain actions and/or functions. However, it should be appreciated that such descriptions contained herein are merely for convenience and that such actions in fact result from computing devices, processors, controllers, or other devices executing the firmware, software, routines, instructions, etc.

It also should be understood that the block and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus the computer systems described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A data processing system for hosting virtual machines in a cloud computing environment comprising:
   a first production cloud, operated at a first data processing platform at a first location, and for providing a set of virtual machines to a first set of customers;
   a second production cloud, operated on a second data processing platform at a second location;
   the second data processing platform also operating a continuity production cloud for the first set of customers;
   a cloud management service for:
   maintaining configuration of the set of virtual machines in the first production cloud as two or more Virtual Data Centers (VDCs) for a specific customer in the first set of customers;
   selective enablement of a business continuity service for failing over selected elements of the production cloud to the continuity production cloud on a per-customer and per-VDC basis,
   such that only a subset of the VDCs for the specific customer are enabled for failing over to the continuity production cloud, and
   wherein the selective enablement for failing over is further for:
   reassigning network addresses;
   updating firewall rules;
   creating virtual private networks;
   configuring load-balancing options;
   creating virtual local area networks; and
   bringing online VMs as specified by the user for each continuity enabled VDC.

2. The system of claim 1 wherein elements of the subset of VDCs enabled for failure are selected from a group consisting of virtual data processors, firewalls, load balancers, and virtual local area networks.

3. The system of claim 1 wherein the first and second data processing platforms further each comprise:
   a replication service, for providing data replication between the first and second location.

4. The system of claim 3 wherein the replication service operates independently of the production cloud and the continuity cloud.

5. The system of claim 1 wherein the first and second data processing platforms further each comprise:
   a network interface, for providing secure communication between the production and continuity clouds, such that the first customer is prevented from accessing production or continuity clouds provided for other customers.

6. The system of claim 5 wherein the network interface uses Secure Socket Layer (SSL), Virtual Private Network (VPN) or other security protocols.

7. The system of claim 5 wherein the replication service implements data replication services on a per customer basis, and the cloud management service permits the user to select these services from one or more of mirroring, failover, and failback to be enabled at time of test or time of disaster.

8. The system of claim 5 wherein the network interfaces further comprise:
   a floating network address protocol, enabled upon a time of test or time of disaster, to translate network addresses for the source cloud to network addresses for the target cloud.

9. The system of claim 1 wherein the first and second data processing platforms each further comprise one or more redundant data processing elements to ensure that the business continuity service continues to operate in the event of a failure of a single element.

10. The system of claim 1 wherein the cloud management service further enables the first customer to specify Service Level Agreement (SLA) information including one or more of cost, Recovery Point Objective (RPO) and Recovery Time Objective (RTO).

11. The system of claim 1 wherein the cloud management service enables the first user to disable the business continuity service on a per-customer, per-VDC, or per-VM basis.

12. The system of claim 1 wherein the cloud management service further enables the first customer to specify which one of several possible data processing platforms at several locations are to provide the target production cloud for the first user.

13. The system of claim 1 wherein the cloud management system provides a visual interface for displaying status of the business continuity service on a per-user, per-VDC basis.

14. The system of claim 1 wherein the cloud management system provides an output to the first customer upon failure of the production cloud.

15. The system of claim 1 wherein the cloud management service further maintains configuration of the virtual machines for at least the subset of VDCs enabled for failing over such that a recovery order is specified for the VMs in the subset of VDCs.

16. A method for operating a cloud computing environment comprising:
   operating a first production cloud using a first data processing platform at a first location, and providing a set of virtual machines to a first customer;
   operating a second production cloud using a second data processing platform at a second location;
   the second data processing platform also operating as a continuity production cloud for the first customer;
   maintaining configuration of the set of virtual machines as two or more Virtual Data Centers (VDCs) for at least a specific customer in the first set of customers; and
   selectively enabling a business continuity service for failing over selected elements of the production cloud to the continuity cloud on a per-customer and per-VDC basis,
   such that only a subset of the VDCs for the specific customer are enabled for failing over the continuity production cloud; and
   in an event of a disaster at the production cloud, the method comprises further steps carried out at the continuity cloud as follows:
   network addresses are re-assigned;
   firewall rules are updated;
   virtual private networks are created;
   load-balancing options are configured;
   virtual local area networks are created; and
   a recovery plan is executed for each continuity enabled VDC to bring online VMs as specified by the user in an order of recovery.

17. The method of claim 16 wherein an event of a disaster at the production cloud, the method comprises further steps carried out at the continuity cloud as follows:
   standby network interfaces are activated; and
   the recovered VMs are rebalanced.

18. The method of claim 16 wherein an event of a test at the production cloud, the method comprises further steps carried out at the continuity cloud as follows:
   virtual machine disks are cloned; and
   DNS updates are initiated for the recovered VMs.

19. The method of claim 15 wherein the step of maintaining configuration of the set of virtual machines for the subset of VDCs that are enabled for failing over such that a VM recovery order is specified on a per-VM basis.

* * * * *

UNITED STATES PATENT AND TRADEMARK OFFICE
CERTIFICATE OF CORRECTION

Page 1 of 1

PATENT NO. : 8,805,989 B2
APPLICATION NO. : 13/531744
DATED : August 12, 2014
INVENTOR(S) : Satish K. Hemachandran et al.

It is certified that error appears in the above-identified patent and that said Letters Patent is hereby corrected as shown below:

In the Specification:
Col. 7, line 8 should read:
one's customer one 104-1-1, VDC 1, VDC 3 and VDC 4 for Col. 10, line 2 should read:
Hardware, firmware, software, or any combination thereof.

Signed and Sealed this
Eleventh Day of November, 2014

Michelle K. Lee
*Deputy Director of the United States Patent and Trademark Office*